Sept. 12, 1967  W. C. SCHUEMANN  3,341,727
IONIZATION GAUGE HAVING A PHOTO-CURRENT SUPPRESSOR ELECTRODE
Filed Nov. 3, 1965  3 Sheets-Sheet 1

Inventor
Wilfred C. Schuemann
By Merriam, Smith & Marshall
Attorneys

United States Patent Office

3,341,727
Patented Sept. 12, 1967

3,341,727
IONIZATION GAUGE HAVING A PHOTO-CURRENT SUPPRESSOR ELECTRODE
Wilfred C. Schuemann, Champaign, Ill., assignor to The University of Illinois Foundation, a non-profit corporation of Illinois
Filed Nov. 3, 1965, Ser. No. 514,735
7 Claims. (Cl. 313—7)

ABSTRACT OF THE DISCLOSURE

An ionization gauge which removes the low pressure limitation due to X-rays by utilizing a suppressor electrode intermediate a shield and the ion collector electrode, with the suppressor electrode located in the shadow of the shield as defined by the X-rays passing therethrough. An improved ion beam source having a grid cage and the filament-cathode maintained outside of the grid to provide efficient ion production.

---

This application is a continuation in part of my application bearing Serial No. 241,740, filed December 3, 1962, now abandoned. This invention relates to a vacuum gauge, and, more particularly, to an ionization vacuum gauge.

For many years, the ionization gauge has been widely used to measure the total and partial pressures in a vacuum system. In a conventional gauge, low energy electrons of approximately 150 electron volts, emitted from a filament cathode and accelerated by a positively charged anode or grid, collide with molecules of gas present in the system. In this manner, the neutral molecules are changed to positive ions. The resulting ions are attracted to an ion-collector electrode of opposite charge thereby causing a current to flow in a collector circuit. This current is proportional to the total and partial pressure in the vacuum system.

The electrons eventually strike the positively charged grid thereby producing X-rays. The X-rays might irradiate the collector electrode, and cause the emission of photoelectrons which establishes a second current indistinguishable from that caused by the positive ions. This photoelectron current is constant and independent of pressure.

The purpose of the gauge is to measure the total or partial pressure of gases, and as the pressure is reduced, the ion current at the collector electrode is reduced. At a sufficiently low pressure, the current resulting from the emission of photoelectrons becomes comparable to the ion current, and consequently the current measured at the collector electrode is no longer proportional to the pressure. Hence, the usefulness of the gauge is reduced. With the conventional ionization gauge it was not possible to measure a vacuum having a pressure below $10^{-8}$ torr. (The torr is defined as the pressure necessary to support a column of mercury one millimeter high.)

In recent years the inverted ionization gauge has received wide-spread acceptance. Commercial gauges of this type are measuring pressures of $10^{-10}$ torr. On a laboratory scale, it is possible to build gauges measuring pressures on the order of $10^{-11}$ torr. In this gauge the filament electrode is outside the grid and the collector electrode is a thin wire arranged along the axis of the gauge and surrounded by the grid. By providing an ion-collector electrode of greatly reduced surface area, the amount of X-ray radiation intercepted by the ion-collector electrode is relatively small and therefore a much smaller photoelectron current is produced than in the conventional cylindrical collector electrode. Regardless, at sufficiently low pressures the photoelectron current is comparable to the ion current, and the gauge then is not capable of measuring pressure as a linear function of the collector current. The pressure at which this occurs is commonly referred to as the X-ray limit of the gauge, and it seems doubtful that the inverted ionization gauge can be made with an X-ray limit much below the values stated above. Efforts have been made to lower this limitation, but these have not been altogether successful.

One method which has been tried, in attempts to lower the X-ray limit, is to place an electrode between the region in which the ions are created and the ion-collector electrode. This electrode is biased sufficiently negative with respect to the collector electrode to reverse all photoelectrons emitted therefrom, and to return the photoelectrons back to the collector electrode. In view of this function, an electrode of this type is referred to in the art as a suppressor electrode. However, since the X-rays irradiate the negative electrode, photoelectrons are emitted from the electrode and some fraction of these go to the collector. These photoelectrons constitute a new current which is independent of pressure and gives rise to a new X-ray limit.

In accordance with the present invention, I provide an ionization gauge which suppresses the photoelectron current at the ion-collector electrode without introducing any new photoelectron current. By reason of the invention, the current registered at the collector electrode is the ion current only. The ionization gauge of the present invention comprises a cathode for emitting electrons and a positively charged acceleration electrode. An ion-collector electrode is mounted external to the acceleration electrode, and a shield member having an opening is arranged between the collector electrode and the acceleration electrode. A suppressor electrode (the exact function of which is explained hereafter in detail) is interposed between the shield member and the collector electrode, and is positioned in the shadow of the shield member as defined by the X-rays emitted from the acceleration electrode and passing through the opening of the shield member. In this manner, no X-rays strike the suppressor electrode.

The acceleration electrode has impressed thereon a potential which is positive with respect to the cathode emitting electrons. The collector electrode and the shield member have a potential impressed thereon which is relatively less positive, with respect to the cathode and therefore with respect to the acceleration electrode, and may be of zero potential. The suppressor electrode has a potential impressed thereon which is negative with respect to the shield member and to the collector electrode.

The positive ions produced in the ionization region are focused through the opening in the shield member (as described in greater detail hereinbelow) and are attracted to the collector electrode. Most of the X-rays emitted when the electrons strike the acceleration electrode are intercepted by the shield member, and because the X-rays are at a relatively low energy level, they cannot penetrate the shield member. The photoelectrons created upon the X-rays striking the marginal edge of the opening in the shield are repelled by the relatively higher negative potential impressed upon the suppressor electrode, and therefore do not reach the collector electrode. Some of the X-rays emitted from the acceleration electrode pass through the opening of the shield member. As explained above, the suppressor electrode is positioned in the shadow of the shield member, and therefore the X-rays which pass through the opening of the shield member are not intercepted by the suppressor electrode. If any X-rays were intercepted by the suppressor electrode, photoelectrons would be created which would be collected at the collector electrode thereby establishing a photoelectron current. However, the X-rays which pass through the opening of the shield member do strike the collector electrode, and thereby cause the emission of photoelectrons. The suppressor electrode has impressed thereon a relatively greater negative potential, and consequently the photoelectrons emitted from the collector electrode are repelled by the negative potential of the suppressor electrode. The path of the photoelectrons is reversed back to the collector electrode thereby resulting in a net photoelectron current of zero. It is true that X-rays which might be reflected from the collector electrode will irradiate the suppressor electrode, but it has been shown that this effect is substantially undetectable. The suppressor electrode thus suppresses the photoelectron current at the ion-collector electrode without introducing any new photoelectron current of significance.

In order to describe the invention in greater detail, reference is now made to the accompanying drawings, in which.

Figure 1:
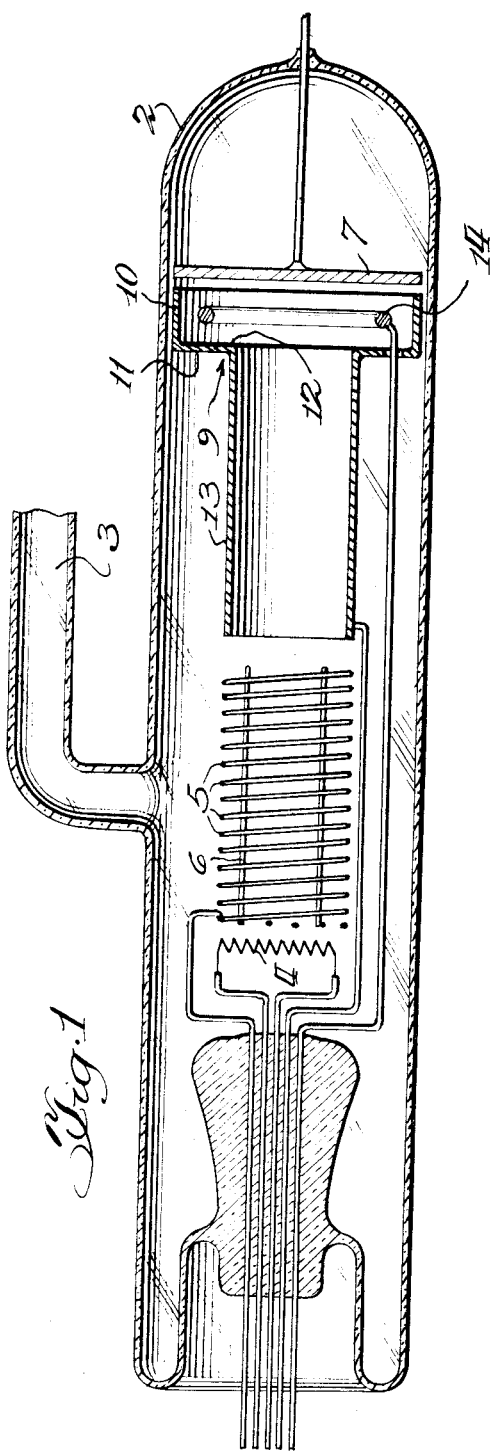
FIGURE 1 is a cross-sectional view showing the apparatus embodying my invention.
Figure 2:
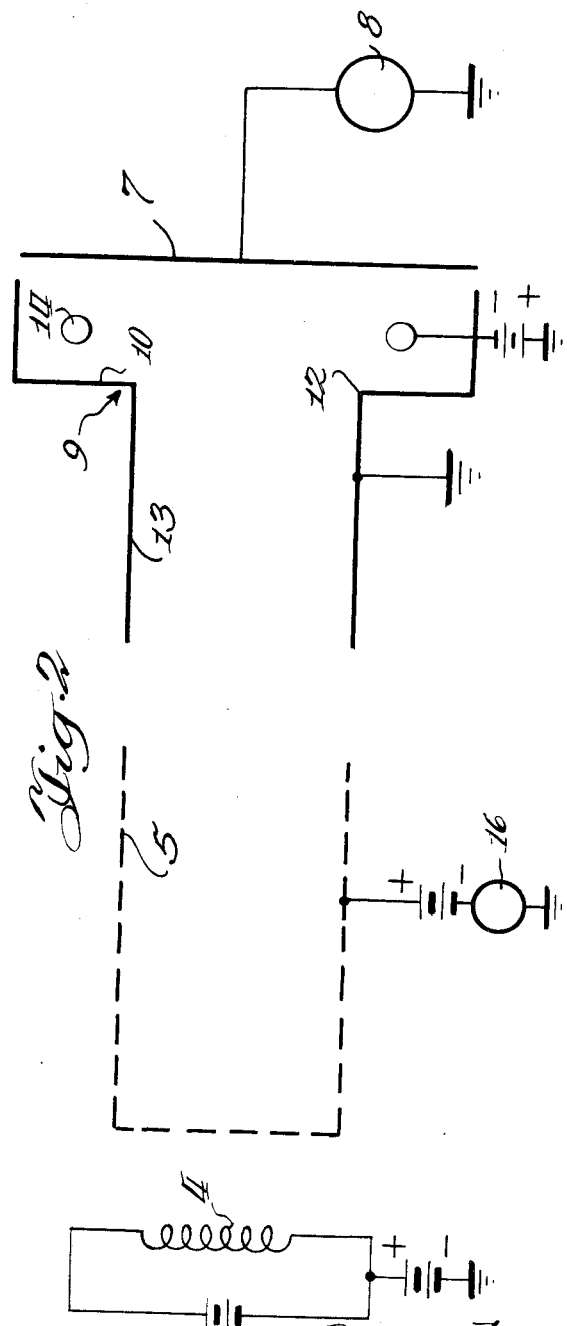
FIGURE 2 is a schematic representation of the apparatus of the invention.

Referring to FIGURES 1 and 2 wherein like numerals designate similar parts throughout the various views, there is shown an envelope 2 of glass or other material which is impervious to gases. The envelope is provided with a suitable extension 3 for providing communication between the tube and the vacuum system, the pressure in which is to be measured. It should be understood that the envelope may be omitted, and the gauge may be inserted or mounted directly into the vacuum chamber. A cathode or filament 4 is disposed adjacent to the acceleration electrode or grid 5. The cathode 4 is connected to a suitable power source as shown in FIGURE 2. Grid 5 formed of fine wire, comprises a cylinder closed at one end, and is arranged adjacent to the cathode 4 and spaced therefrom. The grid 5 is supported by one or more supporting wires 6.

In the opposite end of glass tube 2 is a collector electrode 7 of conducting material which is connected to a suitable current measuring device 8, e.g. ammeter. The collector electrode, as illustrated, comprises a plate, and has as its purpose to collect the positive ions produced in the tube. A shield, indicated generally at 9, is arranged in the tube between grid 5 and collector electrode 7. One function of the shield is to intercept those X-rays emitted from the ionization region within the grid which could irradiate the suppressor ring, and therefore is of sufficient thickness to absorb the X-rays. Another function of the shield is to accelerate the ions formed within the grid.

The potential of the wall of tube 2 is competing with that of shield 9 for the attraction of ions. In order to prevent the ions from reaching the wall of the tube, the shield is provided in the form of a substantially cylindrical member 10 having its vertical axis substantially coaxial with the vertical axis of the grid. In the preferred embodiment, the cylinder 10 includes a partition 11 having opening 12 therein disposed along the central axis of the grid, and an elongated reduced portion 13 extends from the partition and has substantially the same internal diameter as the diameter of the opening. In this manner, the ions are directed through the cylindrical shield to the collector electrode thereby substantially eliminating the possibility of any ions being attracted to the wall of the tube. The shield 9 also intercepts X-rays reflected from the glass walls of envelope 2 thereby preventing the majority of reflected X-rays from impinging on the suppressor electrode.

Where desired, opening 12 of shield 9 may be covered with a grid of suitable conducting material to minimize the possibility of electrons from the ionization region reaching the collector electrode when the suppressor voltage is low. Also, the opening 12 preferably has a smaller diameter than the diameter of the grid to minimize the number of X-rays passing therethrough and to allow the shield, suppressor electrode and collector electrode to be made as small as possible. This elongated reduced portion 13 may be omitted, and the walls of the envelope 2 may be coated with a suitable conducting material, e.g. platinum, aluminum, gold, etc.

A suppressor electrode 14 of suitable conducting material is interposed between collector electrode 7 and shield 9 behind partition 11, and is arranged in such a manner as to be in the shadow of the shield as defined by the X-rays emitted from the ionization region and passing through hole 12 of the shield. Preferably, the suppressor electrode 14 is an annular ring concentrically disposed with relation to hole 12 and of somewhat larger diameter so as to be in the shadow of the shield. Suppressor electrode 14 is connected to a suitable power source to have impressed thereon a negative potential. It is essential that electrode 14 be biased sufficiently negative to prevent any photoelectrons produced at the collector plate from escaping therefrom, and secondly to prevent any photoelectrons ejected upon some of the X-rays striking the marginal edge of hole 12 in the shield from passing to the collector plate.

When it is desired to measure the pressure of the vacuum system, a potential is applied to the cathode 4 such that the acceleration electrode or grid 5 is positive with respect to the cathode. The ion-collector electrode 7 has a potential applied thereto which is negative with respect to both the cathode and the acceleration electrode, and may be grounded for a zero potential. In series with the grid 5 is an ammeter 16 for measuring the current between the cathode and the grid, thereby determining the number of electrons passing through the tube. Ammeter 8 is connected in series with the collector electrode 7 to indicate the current through the collector electrode due to the ions produced within the tube. The potential for the shield 9 is desirably the same as that for the collector, and suppressor electrode 14 has a potential impressed thereon which is negative with respect to all the other elements of the gauge.

In operation, electrons emitted from cathode 4 are attracted to grid 5, and most of these electrons pass through the fine turns of wire and into the interior of the grid. The grid is preferably closed at one end with a suitable grid cap, for otherwise the ions could be drawn out both ends of the grid, and also the focusing properties are substantially destroyed in that the ions will not be concentrated in a relatively narrow beam for the same size grid. The cap is preferably formed of wire mesh because electrons commonly oscillate repeatedly through the grid, and the grid cap bottom minimizes the probability that the electrons will be stopped to enter the ionization region. The electrons are prevented from entering the ion-collector region because this region is negative with respect to the cathode 4. Some of the electrons, as they move about in the interior of the grid, collide with gas molecules thereby producing ions which are attracted toward the relatively negative collector region. The positive ions are accelerated and focused, by means of an electrostatic lens formed by the electric fields within the grid 5 and shield 9, through the hole 12, and the ions are collected at the collector electrode 7. If the current of electrons through the tube is held constant, the number of ions produced per unit time will be substantially proportional to the pressure of the gas inside the tube. Therefore, since the current passing from the collector electrode through ammeter 16 is proportional to the number of ions which reach the collector electrode per unit time, the reading on 8 is an indication of the pressure in the tube.

Although most of the X-rays produced at the grid will be intercepted by the shield 9, some of the X-rays will strike the marginal edge of opening 12 of the shield thereby emitting photoelectrons. However, the photoelectrons are repelled by suppressor electrode 14 which is highly negative thereby reversing the direction of the photoelectrons back toward the ionization region and grid 5. In addition, some X-rays may pass directly through the hole 12 of the shield 10 without contacting any part of the shield or electrode 14, and these X-rays strike the collector electrode 7. The photoelectrons created at the collector electrode begin returning to the ionization region, but they are repelled by the highly negative suppressor electrode 14. Here again, the direction of the path of the photoelectrons is reversed, and the photoelectrons are returned to the collector electrode thereby resulting in a net photoelectron current of zero at the collector electrode.

Figure 3:
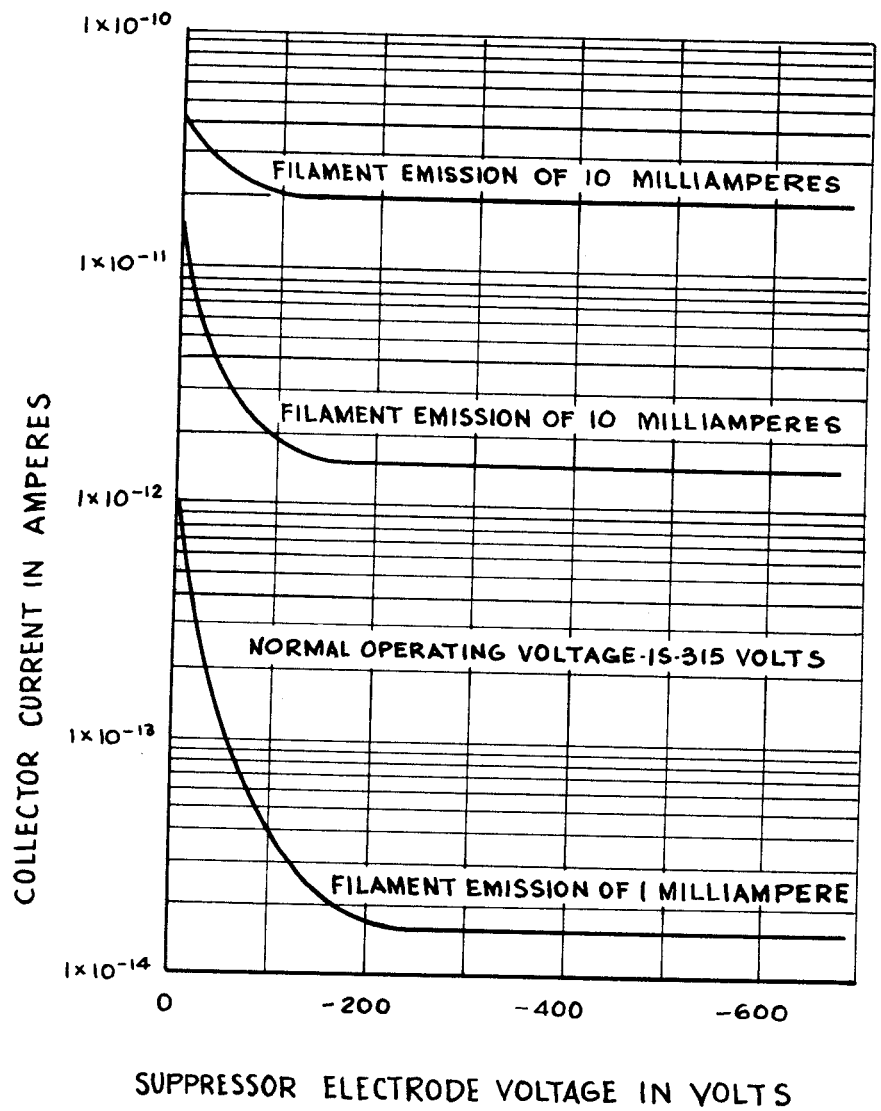
FIGURE 3 is a graph showing the result of the negative potential impressed upon the suppressor electrode versus the collector current.

The most meaningful characteristic curve which can be obtained from this type of gauge is a plot of collector current versus suppressor electrode voltage at constant pressure. The relationship between collector electrode current and pressure measured by the gauge is determined by a comparison with a known standard. For this gauge, the collector electrode current must be multiplied by a factor of approximately 10 when operating at 10 milliamperes cathode emission to obtain the value of pressure in torr. Such curves should show that when the suppressor voltage is zero, the collector current is the sum of the photoelectron current and the ion current. As the suppressor voltage is increased, the photo current should be suppressed until, finally, only the ion current remains. FIGURE 3 shows such curves for pressures of approximately $2 \times 10^{-10}$ torr, $2 \times 10^{-11}$ torr, and $2 \times 10^{-12}$ torr. It will be observed that each curve is constant at a sufficiently high suppressor electrode voltage. As all photoelectron currents would be affected by variations in the suppressor electrode voltage, the constant or level portion of the curves must be attributed to ion-current which is not substantially affected by such variations. The magnitude of the decrease in ion-collection current as suppressor electrode voltage is increased is substantially the same for all three pressures. The only current which is independent of pressure is the photoelectron current, which is this magnitude of the decrease. It will be noted that the photoelectron current, which is suppressed by increasing the suppressor electrode voltage, is equivalent to approximately $1.5 \times 10^{-10}$ torr. Thus, all data on this graph indicate that the gauge is suppressing the photoelectron current and is measuring the ion current when operated at a sufficiently high suppressor electrode voltage.

Figure 4:
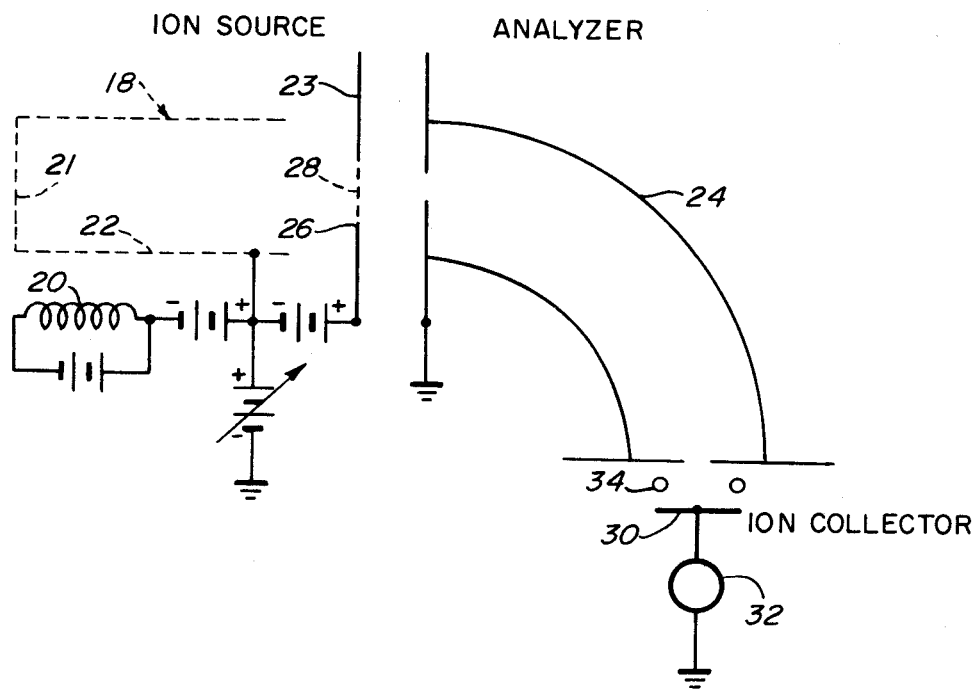
FIGURE 4 is a schematic representation showing a further modification of the invention for use in a mass spectrometer.

According to the modification shown in FIGURE 4, the ion source is employed in analysis for measuring the partial pressures of gases in a vacuum system. This would be particularly applicable in a mass spectrometer, such as a magnetic deflection mass spectrometer or a quadropole mass spectrometer. In FIGURE 4, the ion source, indicated generally by the numeral 18, is integral with the vacuum system substantially as described above with reference to FIGURES 1 and 2. A cathode or filament 20 is mounted adjacent to the acceleration electrode or grid 22 connected to a suitable power source. Grid 22 is opened at one end and preferably closed at the opposite end with grid cap 21 as described above.

A shield 23 is arranged between the grid 22 opposite the closed end thereof and analyzer 24. Shield 23 comprises a substantially flat plate having a central opening 26 covered with a grid 28 to prevent undesired distortion of the electric fields in the ionization region. Shield 23 functions as an ion acceleration electrode. When desired, grid 28 may be omitted, or shield 23 may be provided with an elongated reduced portion as described above, depending upon the focusing or acceleration properties required. Also, the diameter of the opening 26 may be less than the diameter of the grid to discriminate against ions with undesirable trajectories, and/or to provide an appropriate entrance aperture for the analyzer 24.

Analyzer 24, for a typical mass spectrometer, passes only ions with a chosen charge to mass ratio to the ion-collector 30. The current registered on the ammeter 32 determines the amount of gas present if one knows the proportionality between current and pressure. Mass spectroscopy is well known in the art, and a complete description of the mass spectrometer, including an ion source and analyzer, is found in A. O. Nier, Review of Scientific Instruments, volume 18, page 398, published in 1947, and W. Paul and H. Steinwedel, Zeithchrift Naturs, volume 48, page 448, published in 1953.

When operating the mass spectrometer at very low pressures such that the photoelectron current is comparable to the ion current as described above, a suppressor electrode 34 is interposed adjacent the ion-collector electrode 30 and between the ion collector and the analyzer 24. The suppressor electrode is arranged in such a manner as to be in the shadow of the exit aperture of the analyzer as defined by X-rays emitted from the ionization and passing through said exit aperture. The suppressor electrode is desirably of the configuration described above and performs the same function.

What is claimed is:
1. An ionization vacuum gauge comprising,
   a cathode to supply electrons,
   an acceleration electrode adjacent said cathode,
   an ion-collector electrode spaced from said cathode,
   a substantially cylindrical shield arranged between said acceleration electrode and said ion-collector electrode, said shield including a partition transverse to the vertical axis of said cylindrical shield and having an opening therein, and including an elongated reduced portion extending from said partition toward said acceleration electrode and having an internal diameter substantially the same as the internal diameter of said opening,
   and an annular suppressor electrode interposed immediately adjacent said partition between said partition and said ion-collector electrode and arranged in the shadow of said shield as defined by X-rays emitted from said acceleration electrode and passing through said opening of said shield.
2. An ionization vacuum gauge comprising,
   an envelope having therein a cathode and an ion-collector electrode mounted in spaced relationship in said envelope,
   an acceleration electrode mounted adjacent said cathode,
   a substantially cylindrical shield arranged between said acceleration electrode and said ion-collector electrode, said shield including a partition transverse to the vertical axis of said cylindrical shield and having an opening therein, and including an elongated reduced portion extending from said partition toward said acceleration electrode and having an internal diameter substantially the same as the internal diameter of said opening,
   an annular suppressor electrode interposed between said partition and said ion-collector electrode and arranged in the shadow of said shield as defined by X-rays emitted from said acceleration electrode and passing through said opening of said shield,
   and connections for imposing a negative potential on said annular electrode with respect to the potential on said cathode, said ion-collector electrode and said shield.
3. An ionization vacuum gauge comprising,
   a cathode to supply electrons and an ion-collector electrode mounted in spaced relationship,
   an acceleration electrode of substantially cylindrical configuration formed of open continuous wires and mounted adjacent said cathode, a substantially cylindrical shield arranged between said acceleration electrode and said ion-collector electrode, said shield having its main vertical axis substantially coaxial with the main vertical axis of said acceleration electrode, said shield including a partition transverse to the vertical axis of said cylindrical shield and having an opening therein, and including an elongated reduced portion extending from said partition toward said acceleration electrode and having an internal diameter substantially the same as the diameter of said opening, an annular suppressor electrode interposed between said partition and said ion-collector electrode and arranged in the shadow of said shield as defined by X-rays emitted from said acceleration electrode and passing through said opening of said shield, and connections for imposing a negative potential on said annular electrode with respect to the potential on said cathode, said ion-collector electrode and said shield.

4. An ionization vacuum gauge comprising:
an ion collector electrode;
a grid of substantially cylindrical construction closed at one end and formed of open continuous wires, said grid defining an ionization region within said wires with the open end of said cylindrical configuration directed towards said ion collector electrode;
a cathode spacially separated from said grid to supply electrons passing through said grid and entering into said ionization region;
a shield having an opening therein arranged between said grid and said ion collector electrode, said shield including a partition substantially transverse to the flow of ions from said ionization region towards said ion collector electrode; and
an annular suppressor electrode interposed immediately adjacent said partition between said partition and said ion collector electrode and arranged in the shadow of such shield as defined by X-rays emitted from said grid and passing through said opening of said shield.

5. In an ionization vacuum gauge, having an ion collector electrode for attracting an ion beam, an improved ion beam source comprising:
an apertured grid of substantially cylindrical configuration closed at one end and defining an ionization region within the inner portion of said grid communicating with the open end of said grid;
a cathode spacially separated from said grid to supply electrons passing through said apertured grid and entering into said ionization region; and
means for accelerating the ions in said ionization region within said grid towards said ion collector electrode, said means including a shield disposed adjacent the open end of said grid and intermediate said grid and said ion collector electrode.

6. An improved ion source for supplying an ion beam, said ion source comprising:
an apertured grid of substantially cylindrical configuration closed at one end and defining an ionization region within the inner portion of said grid communicating with the open end of said grid;
a cathode spacially separated from said grid to supply electrons passing through said apertured grid and entering into said ionization region; and
means for accelerating the ions in said ionization region within said grid, said means disposed adjacent the open end of said grid.

7. An improved ion source as claimed in claim 6, wherein said apertured grid comprises a substantially cylindrical configuration formed of open continuous wire.

References Cited

UNITED STATES PATENTS

| 2,887,582 | 5/1959 | Craig | 250—41.9 |
| 3,001,128 | 9/1961 | Nottingham | 313—7.5 |
| 3,109,115 | 10/1963 | Lafferty | 313—7 |
| 3,292,078 | 12/1966 | Herzog | 313—7 |

DAVID J. GALVIN, *Primary Examiner.*

S. D. SCHLOSSER, *Examiner.*